US010699453B2

(12) United States Patent
Jin et al.

(10) Patent No.: US 10,699,453 B2
(45) Date of Patent: Jun. 30, 2020

(54) DIGITAL MEDIA ENVIRONMENT FOR STYLE-AWARE PATCHING IN A DIGITAL IMAGE

(71) Applicant: Adobe Inc., San Jose, CA (US)

(72) Inventors: Hailin Jin, San Jose, CA (US); John Philip Collomosse, Ripley (GB); Brian L. Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/679,602

(22) Filed: Aug. 17, 2017

(65) Prior Publication Data
US 2019/0057527 A1   Feb. 21, 2019

(51) Int. Cl.
*G06T 11/40* (2006.01)
*G06T 11/60* (2006.01)
(Continued)

(52) U.S. Cl.
CPC ............. *G06T 11/40* (2013.01); *G06N 3/02* (2013.01); *G06T 5/005* (2013.01); *G06T 5/50* (2013.01);
(Continued)

(58) Field of Classification Search
CPC ......... G06T 11/40; G06T 11/60; G06T 15/30; G06T 5/005; G06T 7/408; G06T 7/11;
(Continued)

(56) References Cited

U.S. PATENT DOCUMENTS 6,160,923 A * 12/2000 Lawton ............... G06T 5/20
382/260
8,233,739 B1 * 7/2012 Cho ............... G06T 11/60
345/582
(Continued)

FOREIGN PATENT DOCUMENTS

EP        16306754 A2 * 12/2016
GB        2255699       11/1992

OTHER PUBLICATIONS

Lu, Xin et al., "Deep Multi-Patch Aggregation Network for Image Style, Aesthetics, and Quality Estimation", p. 990-998,www.cv-foundation.org/openaccess/content_iccv_2015/papers/Lu_Deep_Multi-Patch_Aggregation_ICCV_2015_paper.pdf, 2015.*
(Continued)

*Primary Examiner* — Chante E Harrison
(74) *Attorney, Agent, or Firm* — SBMC

(57) ABSTRACT

Techniques and systems are described for style-aware patching of a digital image in a digital medium environment. For example, a digital image creation system generates style data for a portion to be filled of a digital image, indicating a style of an area surrounding the portion. The digital image creation system also generates content data for the portion indicating content of the digital image of the area surrounding the portion. The digital image creation system selects a source digital image based on similarity of both style and content of the source digital image at a location of the patch to the style data and content data. The digital image creation system transforms the style of the source digital image based
(Continued)

on the style data and generates the patch from the source digital image in the transformed style for incorporation into the portion to be filled of the digital image.

20 Claims, 8 Drawing Sheets

(51) Int. Cl.
  *G06T 11/00* (2006.01)
  *G06N 3/02* (2006.01)
  *G06T 5/50* (2006.01)
  *G06T 5/00* (2006.01)

(52) U.S. Cl.
  CPC ............ *G06T 11/001* (2013.01); *G06T 11/60* (2013.01); *G06T 2207/20021* (2013.01); *G06T 2207/20076* (2013.01); *G06T 2207/20221* (2013.01)

(58) Field of Classification Search
  CPC . G06T 2207/10004; G06T 2207/10016; G06T 11/001; G06T 5/50; G06T 2207/10024; G06T 2207/20076; G06T 2207/20021; G06T 2207/20221; G09G 5/14; G09G 5/393; G06N 3/02
  USPC .......................... 345/619, 620, 622, 626, 629
  See application file for complete search history.

(56) References Cited

U.S. PATENT DOCUMENTS

| | | | |
|---|---|---|---|
| 8,249,365 B1* | 8/2012 | Winnemoeller | G06T 11/001 382/181 |
| 8,340,463 B1* | 12/2012 | Cho | G06K 9/6297 382/162 |
| 8,670,630 B1* | 3/2014 | Kwatra | G06T 5/005 382/254 |
| 9,208,548 B1 | 12/2015 | Noble et al. | |
| 9,552,626 B1* | 1/2017 | Gilra | G06T 5/001 |
| 9,697,234 B1* | 7/2017 | Dhua | G06F 16/5846 |
| 9,922,425 B2* | 3/2018 | Partis | G06T 7/11 |
| 10,134,108 B2* | 11/2018 | Amirghodsi | G06T 7/11 |
| 10,198,839 B2* | 2/2019 | Rymkowski | G06T 11/60 |
| 10,282,877 B2* | 5/2019 | Bedi | G06T 11/60 |
| 10,614,557 B2 | 4/2020 | Lin et al. | |
| 2006/0104542 A1* | 5/2006 | Blake | G06K 9/469 382/284 |
| 2012/0141045 A1 | 6/2012 | Bae et al. | |
| 2013/0051685 A1* | 2/2013 | Shechtman | G06T 11/60 382/218 |
| 2013/0266208 A1* | 10/2013 | Lim | G06T 5/005 382/154 |
| 2014/0201126 A1* | 7/2014 | Zadeh | G06K 9/627 706/52 |
| 2014/0254882 A1* | 9/2014 | Jin | G06T 7/248 382/107 |
| 2015/0036945 A1* | 2/2015 | Zuliani | G06T 5/005 382/266 |
| 2016/0027159 A1* | 1/2016 | Amirghodsi | G06T 5/30 382/195 |
| 2017/0140514 A1* | 5/2017 | Amirghodsi | G06T 5/50 |
| 2017/0178325 A1 | 6/2017 | Ye et al. | |
| 2017/0278289 A1* | 9/2017 | Marino | G06T 11/60 |
| 2017/0372193 A1 | 12/2017 | Mailhe et al. | |
| 2018/0082715 A1* | 3/2018 | Rymkowski | G06T 11/60 |
| 2018/0096454 A1* | 4/2018 | Amirghodsi | G06T 7/11 |
| 2018/0107896 A1* | 4/2018 | Sagong | G06K 9/6212 |
| 2018/0121754 A1* | 5/2018 | Carr | G06K 9/00624 |
| 2018/0150940 A1* | 5/2018 | Reinhard | G06T 11/001 |
| 2018/0165798 A1* | 6/2018 | Lin | G06K 9/6267 |
| 2018/0174276 A1* | 6/2018 | Michel | G06T 5/50 |
| 2018/0211380 A1 | 7/2018 | Tandon et al. | |
| 2018/0322662 A1* | 11/2018 | Hellier | G06T 11/001 |
| 2018/0350030 A1* | 12/2018 | Simons | G06T 13/40 |
| 2019/0043242 A1* | 2/2019 | Risser | G06K 9/6202 |
| 2019/0066268 A1 | 2/2019 | Song et al. | |
| 2019/0066733 A1 | 2/2019 | Somanath et al. | |
| 2019/0073792 A1 | 3/2019 | Fletcher et al. | |
| 2019/0095730 A1 | 3/2019 | Fu et al. | |
| 2019/0114511 A1 | 4/2019 | Gao et al. | |
| 2019/0114748 A1 | 4/2019 | Lin et al. | |
| 2019/0114818 A1 | 4/2019 | Lin et al. | |
| 2019/0347772 A1 | 11/2019 | Zhang et al. | |
| 2019/0355102 A1 | 11/2019 | Lin et al. | |

OTHER PUBLICATIONS

Achanta,"SLIC Superpixels Compared to State-of-the-Art Superpixel Methods", IEEE Transactions on Pattern Analysis and Machine Intelligence, vol. 34, No. 11, Nov. 2012, pp. 2274-2281.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Efros,"Image Quilting for Texture Synthesis and Transfer", SIGGRAPH 2001, Computer Graphics Proceedings, ACM Press/ACM SIGGRAPH, E. Fiume, Ed.,, 2001, 6 pages.
Efros,"Texture Synthesis by Non-parametric Sampling", In: IEEE International Conference on Computer Vision. (1999), Sep. 1999, 6 pages.
Farbman,"Convolution Pyramids", ACM Trans. Graph. 30, 6, Nov. 2012, 9 pages.
Gatys,"Image Style Transfer Using Convolutional Neural Networks", In Proc. CVPR, 2016., Jun. 2016, pp. 2414-2423.
Gatys,"Preserving Color in Neural Artistic Style Transfer", https://arxiv.org/abs/1606.05897, Jun. 19, 2016, 8 pages.
Glasner,"Super-Resolution from a Single Image", Super-Resolution form a Single Image, Oct. 20, 2009, 8 pages.
Hays,"Scene Completion Using Millions of Photographs", ACM SIGGRAPH, vol. 26, 4:1-4, 2007, 7 pages.
He,"Statistics of Patch Offsets for Image Completion", ECCV 2012, 2012, 14 pages.
Klose,"Sampling Based Scene-Space Video Processing", ACM Transactions on Graphics (TOG)—Proceedings of ACM SIGGRAPH 2015, Aug. 2015, 11 pages.
Kohli,"Robust Higher Order Potentials for Enforcing Label Consistency", Retrieved from <<http://research. microsoft.com/en-us/um/people/pkohli/papers/klt_ cvpr08. pdf>> on Jun. 19, 2009, Jan. 2009, 8 pages.
Kwatra,"Graphcut Textures: Image and Video Synthesis Using Graph Cuts", ACM Trans. Graph. 22 (2003), 3, 2003, 10 pages.
Liu,"Exemplar-based Image Inpainting using Multiscale Graph Cuts", IEEE Transactions on Image Processing—vol. 22, Issue: 5, Sep. 13, 2002, 13 pages.
Nguyen,"Synthesizing the preferred inputs for neurons in neural networks via deep generator networks", Nov. 23, 2016, 29 pages.
Perez,"Poisson Image Editing", Proc. ACM SIGGRAPH 2003, Jul. 2003, 6 pages.
Rother, ""GrabCut"—Interactive Foreground Extraction using Iterated Graph Cuts", ACM SIGGRAPH 2004, Aug. 2004, 6 pages.
Wei,"Fast Texture Synthesis Using Tree-Structured Vector Quantization", Proceedings of SIGGRAPH 2000, 2000, 10 pages.
Wilber,"BAM! The Behance Artistic Media Dataset for Recognition Beyond Photography", Computer Vision and Pattern Recognition (cs.CV), Apr. 27, 2017, 10 pages.
Arjovsky,"Wasserstein GAN", Mar. 9, 2017, 32 pages.
Ballester,"Filling-In by Joint Interpolation of Vector Fields and Gray Levels", IEEE transactions on image processing, Apr. 2, 2001, 30 pages.
Bertalmio,"Image Inpainting", SIGGRAPH '00: Proceedings of the 2ih annual conference on computer graphics and interactive techniques, ACM Press/Addison-Wesley Publishing Co., New York, NY, USA, 2000, 8 pages.
Chen,"Fast Patch-based Style Transfer of Arbitrary Style", Dec. 13, 2016, 10 pages.

(56) References Cited

OTHER PUBLICATIONS

Cimpoi,"Describing Textures in the Wild", In Proceedings of the IEEE Conference on Computer Vision and Pattern Recognition, Nov. 15, 2013, 13 pages.
Clevert,"Fast and Accurate Deep Network Learning by Exponential Linear Units (ELUs)", ICLR 2016, Feb. 22, 2016, 14 pages.
Dai,"Deformable Convolutional Networks", Jun. 5, 2017, 12 pages.
Darabi,"Image Melding: Combining Inconsistent Images using Patch-based Synthesis", ACM Transactions on Graphics 31, 4, 82, Aug. 2012, 10 pages.
Goodfellow,"Generative Adversarial Nets", Jun. 10, 2014, 9 pages.
Gulrajani,"Improved Training of Wasserstein GANs", Dec. 25, 2017, 20 pages.
He,"Deep Residual Learning for Image Recognition", Dec. 10, 2015, 12 pages.
Huang,"Image Completion using Planar Structure Guidance", Proceedings of ACM SIGGRAPH 2014, Jul. 2014, 10 pages.
Iizuka,"Globally and Locally Consistent Image Completion", ACM Transactions on Graphics (TOG) 36, Jul. 20, 2017, 13 pages.
Ioffe,"Batch Normalization: Accelerating Deep Network Training by Reducing Internal Covariate Shift", Mar. 2015, 11 pages.
Jaderberg,"Spatial Transformer Networks", Feb. 4, 2016, 14 pages.
Jeon,"Active Convolution: Learning the Shape of Convolution for Image Classification", May 27, 2017, 9 pages.
Johnson,"Perceptual Losses for Real-Time Style Transfer and Super-Resolution.", Mar. 27, 2016, 18 pages.
Karras,"Progressive Growing of GANs for Improved Quality, Stability, and Variation", Feb. 26, 2018, 26 pages.
Kohler,"Mask-specific Inpainting with Deep Neural Networks", Oct. 15, 2014, 12 pages.
Lee,"Deeply-Supervised Nets", Sep. 25, 2014, 10 pages.
Levin,"Seamless Image Stitching in the Gradient Domain", Proceedings of the European Conference on Computer Vision, May 2004, pp. 377-389.
Li,"Combining Markov Random Fields and Convolutional Neural Networks for Image Synthesis", In Proceedings of the IEEE Conference on Computer Vision and Pattern Recognition, Jan. 18, 2016, 9 pages.
Li,"Generative Face Completion", Apr. 19, 2017, 9 pages.
Liu,"Deep Learning Face Attributes in the Wild", Jan. 24, 2015, 11 pages.
Mao,"Least Squares Generative Adversarial Networks", Apr. 5, 2017, 16 pages.
Newson,"Video Inpainting of Complex Scenes", SIAM Journal of Imaging Science 7, 4, Mar. 18, 2015, 27 pages.
Park,"Transformation-Grounded Image Generation Network for Novel 3D View Synthesis", Mar. 8, 2017, 17 pages.
Pathak,"Context Encoders: Feature Learning by Inpainting", CVPR 2016, Nov. 21, 2016, 12 pages.
Radford,"Unsupervised Representation Learning with Deep Convolutional Generative Adversarial Networks", ICLR 2016, Jan. 7, 2016, 16 pages.
Russakovsky,"ImageNet Large Scale Visual Recognition Challenge", Jan. 30, 2015, 43 pages.
Salimans,"Improved Techniques for Training GANs", In Advances in Neural Information Processing Systems, Jun. 10, 2016, 10 pages.
Simakov,"Summarizing Visual Data Using Bidirectional Similarity", In Proceedings of CVPR 2008, Jun. 23, 2008, 8 pages.
Snelgrove,"High-Resolution Multi-Scale Neural Texture Synthesis", In SIGGRAPH ASIA 2017 Technical Briefs, Nov. 27, 2017, 4 pages.
Sutton,"Reinforcement Learning: An Introduction", The MIT Press Cambridge, Massachusetts, 1998, 398 pages.
Xu,"Deep Convolutional Neural Network for Image Deconvolution", In Advances in Neural Information Processing Systems, Dec. 8, 2014, 9 pages.
Yang,"High-Resolution Image Inpainting using Multi-Scale Neural Patch Synthesis", Apr. 13, 2017, 9 pages.
Yeh,"Semantic Image Inpainting with Deep Generative Models", Jul. 13, 2017, 19 pages.
Yu,"Multi-Scale Context Aggregation by Dilated Convolutions", Computer Vision and Pattern Recognition, Apr. 2016, 13 pages.
Zhou,"Places: A 10 million Image Database for Scene Recognition", Jul. 4, 2017, 14 pages.
Zhou,"View Synthesis by Appearance Flow", In European Conference on Computer Vision, Feb. 11, 2017, 16 pages.
"Restriction Requirement", U.S. Appl. No. 15/785,359, dated Jul. 5, 2019, 6 pages.
"Combined Search and Examination Report", GB Application No. 1813278.7, Feb. 18, 2019, 5 pages.
"Combined Search and Examination Report", GB Application No. 1813319.9, Feb. 15, 2019, 6 pages.
"Pre-Interview First Office Action", U.S. Appl. No. 15/785,359, dated Sep. 18, 2019, 4 pages.
"Restriction Requirement", U.S. Appl. No. 15/785,386, dated Aug. 2, 2019, 6 pages.
"Corrected Notice of Allowability", U.S. Appl. No. 15/785,359, dated Jan. 16, 2020, 3 pages.
"Pre-Interview First Office Action", U.S. Appl. No. 15/980,691, dated Dec. 10, 2019, 4 pages.
"Pre-Interview First Office Action", U.S. Appl. No. 15/785,386, dated Dec. 5, 2019, 5 pages.
"Notice of Allowance", U.S. Appl. No. 15/785,386, dated Feb. 6, 2020, 8 pages.
"Notice of Allowance", U.S. Appl. No. 15/785,359, dated Nov. 6, 2019, 9 pages.
"Corrected Notice of Allowability", U.S. Appl. No. 15/785,386, dated Apr. 22, 2020, 2 pages.
"Corrected Notice of Allowability", U.S. Appl. No. 15/785,359, dated Mar. 10, 2020, 3 pages.
"Notice of Allowance", U.S. Appl. No. 15/980,691, dated Apr. 6, 2020, 7 pages.

\* cited by examiner

DIGITAL MEDIA ENVIRONMENT FOR STYLE-AWARE PATCHING IN A DIGITAL IMAGE

BACKGROUND

An increasing number of digital image editing applications and functions available in these applications allow users to quickly and accurately edit digital images to their liking. One common task undertaken by users of digital image editing applications is to repair defects in digital images or remove unwanted objects from the digital images. Conventional digital image editing applications use techniques to repair or remove portions of digital images such as copying patches from elsewhere in the digital image containing the portion, or searching an auxiliary image collection (AIC) to generate patches from other digital images to replace the portion. When using an AIC to generate patches, digital images are selected for content and structural similarity, i.e., patches to fill in a waterfall are sampled from digital images containing waterfalls.

Nevertheless, a number of problems exist with these conventional techniques. Conventional systems that copy patches from elsewhere within the same digital image containing the portion to be replaced provide limited material from which to generate patches. Conventional systems that use an AIC provide a larger number of patch candidates than using only the same digital image, often by searching dozens, hundreds, or thousands of digital images in the AIC based on items of content of the digital image. However, reliance on the content of the digital image alone often leads to false positive digital image search results that do not match the digital image for one reason or another.

Particularly, the content constraints imposed on conventional systems when selecting patches do not enforce a consistent visual style between the patches selected and the digital image that includes the portion to be filled. Additionally, conventional systems do not provide any solutions to harmonize the style of patches during their composition to bridge the visual gap between the original style of a patch and a digital image for which it is to be incorporated. Visual inconsistencies caused by inaccurate patch selection and incorporation are easily detected by users who expect a homogeneous aesthetic style within a completed digital image.

SUMMARY

Techniques and systems are described for style-aware patching of a digital image in a digital medium environment. For example, a digital image creation system generates style data for a portion of a digital image that is to be filled, such as a defect in the image or a hole resulting from a removed portion of the image, where the style data indicates a style of an area surrounding the portion. The style data represents an aesthetic of the digital image including a set of principles underlying a particular manner or technique by which the digital image acquired a distinctive appearance. The style data can indicate aesthetics such as watercolor painting, pencil drawing, spray painting, and so forth, or feelings associated with the digital image such as gloomy, scaly, cheerful, and so on. The digital image creation system also generates content data for the portion indicating content of the digital image of the area surrounding the portion. The content data represents objects or structure within the digital image irrespective of style, such as faces, buildings, a landscape, vehicles, and so forth.

The digital image creation system then selects a source digital image from multiple digital images to be used to generate a patch for the portion to be filled. The digital image creation system selects the source digital image based on a similarity of a style of the source digital image at a location of the patch to the style data and based on a similarity of content of the source digital image at the location of the patch to the content data. Consequently, the source digital image to be used in generating the patch matches not only the content of the portion to be filled (e.g., a waterfall source digital image is used to fill a portion of a waterfall image with a defect), but also the source digital image matches the style of the portion to be filled as well (e.g., a watercolor waterfall source digital image is used to fill a portion of a watercolor waterfall image with a defect).

Next, the digital image creation system generates a patch from the source digital image for the portion to be filled in the digital image. Even though the digital image creation system selected the source digital image based on both content and style similarity to the digital image, some variation may still exist between the digital image and the source digital image that will be used for the patch. To account for these differences, the digital image creation system transforms the style of the source digital image based on the style data for the area surrounding the portion to be filled of the digital image. The style of the source digital image is transformed independent of the content of the area surrounding the portion to be filled of the digital image. In one example, the digital image creation system computes a weighted average of style descriptors of an area surrounding where the patch will be placed in the digital image. Then, the digital image creation system uses the weighted average of style descriptors to harmonize the style of the patch with the area surrounding the patch. Using a weighted average of the style descriptors gives a uniform style between the patch and its surroundings that is easier to incorporate into the digital image that will receive the patch. The digital image creation system then generates the patch from the source digital image in the transformed style for incorporation into the portion to be filled of the digital image. In this way, visual inconsistencies are reduced when manipulating digital images to remove portions of a digital image or repair defects in a digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
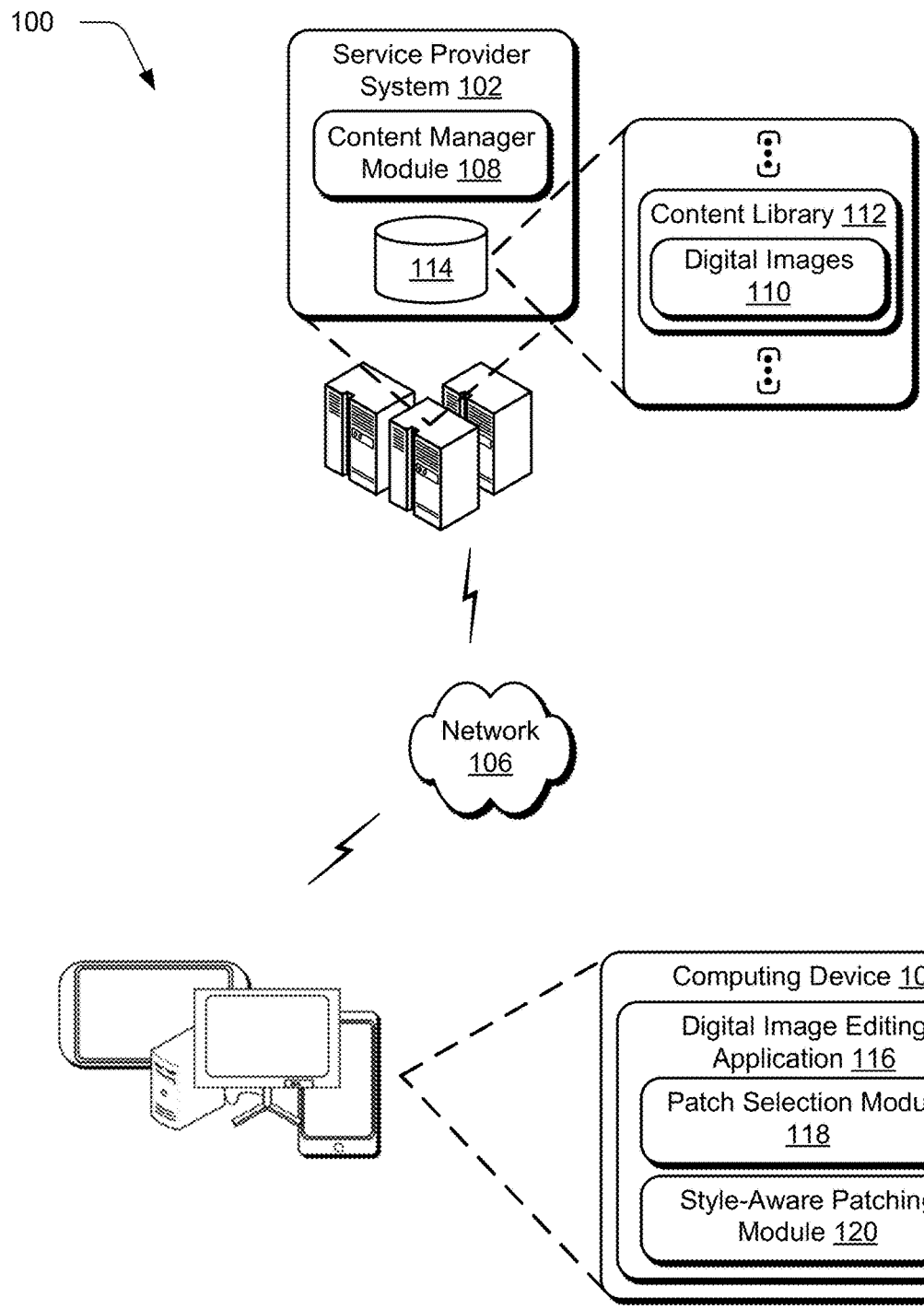
FIG. 1 is an illustration of an environment in an example implementation that is operable to employ techniques for style-aware patching in a digital image described herein.

Digital image editing applications have increasing popularity with users as these applications become more accessible and easier to use. One common reason for manipulating a digital image in a digital image editing application is to remove defects from the digital image, e.g., caused by water droplets on a lens. Additionally, users may want to remove entire objects or structures from a digital image, e.g., that are visually distracting from a desired goal of the image. To do so, the objects or structures are replaced with substitute content so the digital image is not left with an unappealing hole.

Conventional systems support a variety of techniques to replace portions of a digital image that are to be or have been removed. One conventional technique involves copying patches from elsewhere in the same digital image into the portion that was removed. However, this technique provides a limited amount of material from the same digital image to use for copying into the removed portion. For example, if a user wishes to replace a bicycle from the digital image with another bicycle, and the image does not contain any other bicycles, this conventional technique would copy other content from the rest of the digital image without replacing the bicycle.

Another conventional technique involves searching an auxiliary image collection (AIC) to generate patches from other digital images to replace the removed portion. AIC supports a technique in which a selection is made from numerous source digital images are used as a basis to replace a removed portion of a digital image. However, conventional techniques that utilize AICs for patching digital images only rely on the content, or structure, of the digital image and the source digital images in the AIC to select candidate source digital images. For instance, if a user removes a book from the digital image, conventional systems that use an AIC would search all source digital images of books, regardless of the style or aesthetic of the source digital images containing books. This results in a large number of false-positive source digital image search results that cannot be used to generate a patch for the removed portion of the digital image.

Additionally, oftentimes more than one patch is needed to fill a removed portion of a digital image. Conventional techniques focus primarily on removal of structural inconsistencies when composing selected patches into the removed portion of the digital image, attempting to minimize discontinuities in edges and texture. However, conventional techniques do not support harmonization of style and aesthetics of patches during composition to create a homogenous style in the filled portion of the digital image with the rest of the image. When patches from different source digital images in an AIC are used to fill a portion, for example, these patches may have differing styles that are visually disconcerting when incorporated into the removed portion of the digital image.

Accordingly, techniques and systems are described in which a digital image creation system incorporates style awareness into both patch selection and patch composition to provide visually consistent patches for removed portions of digital images. The digital image creation system, for instance, may be configured to support creation and editing of digital images as part of an application of a computing device in a variety of different ways. Examples of which include use as part of an online application (via a subscription-based service system), provide opportunities to purchase a good or service, online storage, or other web service that is accessible via a network. Digital images may include a variety of different content that may be stored digitally or electronically, e.g., movies, books, documents, games, applications, images, audio files, and so on.

To begin, the digital image creation system generates style data and content data for a portion to be filled in a digital image. The style data for the portion indicates a style of an area surrounding the portion to be filled. The style data represents an aesthetic of the digital image including a set of principles underlying a particular manner or technique by which the digital image acquired a distinctive appearance. The style data can indicate aesthetics such as watercolor painting, pencil drawing, spray painting, and so forth, or feelings associated with the digital image such as gloomy, scaly, cheerful, and so on. The digital image creation system may utilize a style classifier trained on numerous digital images to determine one or more aesthetics and/or feelings to include in the style data.

The content data for the portion indicates content of the digital image of the area surrounding the portion. The content data represents objects or structure within the digital image irrespective of style, such as faces, buildings, a landscape, vehicles, and so forth. The digital image creation system may use any suitable technique for generating the content data, such as CAD-like object models, appearance-based methods, feature-based methods, genetic algorithms, and so forth.

The digital image creation system selects a set of source digital images from multiple digital images in the AIC, to generate a set of patches for the portion to be filled. The digital image creation system selects the source digital images based on a similarity of a style of the source digital image at a location of the patch to the style data, and a similarity of content of the source digital image at the location of the patch to the content data. To do so, the digital image creation system applies a Markov Random Field (MRF) optimization to select patches from multiple source digital images, such as from an AIC. The MRF optimization minimizes an energy function by balancing choices of patches from the source digital images to reduce deviation of both style and content between the patches of the source digital images and the digital image containing the portion to be filled. In this way, the source digital image to be used in generating the patch matches not only the content of the portion to be filled, but also more closely matches the style of the portion to be filled as well.

Once the digital image creation system selects the source digital image to use for the patch for the portion to be filled, the digital image creation system can use the source digital image to generate the patch. The digital image creation system generates style data for the area surrounding the portion to be filled of the digital image and independent of the content of the area surrounding the portion to be filled of the digital image. Alternatively, the digital image creation system can use the previously generated style data that was used to select the source digital image. Regardless of the source of the style data, the digital image creation system transforms the style of the source digital image based on the style data for the area surrounding the portion to be filled of the digital image.

For instance, the digital image creation system can use style data derived from multiple superpixels of the digital image near the patch to determine a particular style to transform the source digital image that the patch originates from. Superpixels are groups of pixels formed by perceptually meaningful atomic regions (e.g., uniform in color and/or texture). In some cases, multiple source digital images are used to generate multiple patches to fill a single portion. In this scenario, the digital image creation system computes a weighted average of style descriptors of an area surrounding where the patch will be placed in the digital image. The digital image creation system uses style descriptors of superpixels at or near the patch location in the digital image to blend the style of the patch with its surroundings. Superpixels are used to determine the style of the patch, as they are typically larger than a patch and thus capture style over a greater area where the patch will be incorporated. The digital image creation system uses the weighted average of style descriptors of the superpixels to harmonize the style of the patch with the area surrounding the patch. Using a weighted average of the style descriptors gives a uniform style between the patch and its surroundings that is easier to incorporate into the digital image that will receive the patch.

The digital image creation system then generates the patch from the source digital image in the transformed style for incorporation into the portion to be filled of the digital image. By incorporating style awareness into both patch selection and patch composition, the digital image creation system generates a patch that goes beyond simply content matching, providing more visually harmonious patching for a removed portion of a digital image. The techniques described herein enable patching of a digital image to utilize more diverse range of source digital images, while also reducing false-positive suggestions for patches that may match an object or structure of the digital image but do not match the visual look and feel of the digital image to be completed. Furthermore, stylizing the patch prior to compositing the patch into the digital image harmonizes the patch's appearance to match both the surrounding portions of the digital image and any neighboring patches, reducing the appearance of visual artifacts in an output digital image.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for style-aware patching of digital images as described herein. The illustrated environment 100 includes a service provider system 102 and a computing device 104 that are communicatively coupled, one to another, via network 106. Computing devices that implement the service provider system 104 and the computing device 104 may be configured in a variety of ways.

A computing device, for instance, may be configured as a desktop computer, a laptop computer, a mobile device (e.g., assuming a handheld configuration such as a tablet, digital camera, or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 8.

The service provider system 102 is illustrated as including a content manager module 108 that is implemented at least partially in hardware of a computing device. The content manager module 108 is configured to manage online interaction via the network 106 of the computing device 104 with digital images 110 in a content library 112, which are stored storage 114 of the service provider system 102. As previously described, the digital images 110 may take a variety of forms, such as any content that may be stored digitally or electronically, e.g., movies, books, documents, games, applications, images, audio files, and so on. Thus, interaction with the digital images 110 by the computing device 104 via the network 106 may also take a variety of forms, such as selection of a menu item, voice command, gesture, selection of a hyperlink, and so forth.

The computing device 104 is shown as including a digital image editing application 116 which allows users to interact with digital images, such as by viewing, creating, assembling, editing, compressing, and so forth. Examples of applications that provide functionality which may be included in the digital image editing application 116 include Adobe Photoshop™, Adobe Lightroom™, and so on. The computing device 104 is also shown as including a patch selection module 118 and a style-aware patching module 120, which may be included as part of the digital image editing application 116. The patch selection module 118 is configured to select one or more source digital images based on content and style to use in patching a portion of a digital image. The style-aware patching module 120 is configured to generate a patch from a source digital image for a portion of a digital image by transforming the style of the source digital image to match a style of the digital image that is to receive the patch.

In implementations, the patch selection module 118 obtains a digital image, such as from a camera incorporated into the computing device 104, or from the digital images 110 located in the content library 112 of the storage 114 of the service provider system 102, to name some examples. The digital image includes a portion that has been removed from the digital image, which may be removed either by a user input or automatically by the computing device 104 such as to remove a defect in the digital image.

The patch selection module 118 selects one or more source digital images to use in generating patches to fill the removed portion of the digital image. The patch selection module 118 selects the source digital images based on both a similarity of a style of a source digital image at a location of the patch to the style surrounding the portion to be filled, and a similarity of content of the source digital image at the location of the patch to the content surrounding the portion to be filled. For example, the patch selection module 118 selects one or more source digital images from the digital images 110 in the content library 112 in the storage 114 of the service provider system 102 via the network 106. The content library 112 in this example may be an auxiliary image collection (AIC) that includes hundreds, thousands, millions, or even more items of digital content such as digital images, videos, vector artwork, 3D assets, and so forth that can be used by the patch selection module 118 to select source digital images for generating style-aware patches as described above and below. One example of an application that provides functionality which may be included in the content library 112 is Adobe Stock™, although any suitable content library may be used.

With one or more source digital images selected for generating the patch, the style-aware patching module 120 transforms the style of the source digital images to match the style of the digital image with the portion to be filled at the location of the portion. The style-aware patching module 120 uses the source digital image in the transformed style to generate the patch for incorporation into the portion of the digital image. Then, the digital image with the incorporated patch in the portion can be output by the computing device 104, such as to a user interface or to the service provider system 102 to be stored in the storage 114. The content library 112 of the service provider system 102 can make the digital images 110 available to additional devices, for example additional client devices via the network 106, e.g., as part of a subscription-based service.

Figure 2:
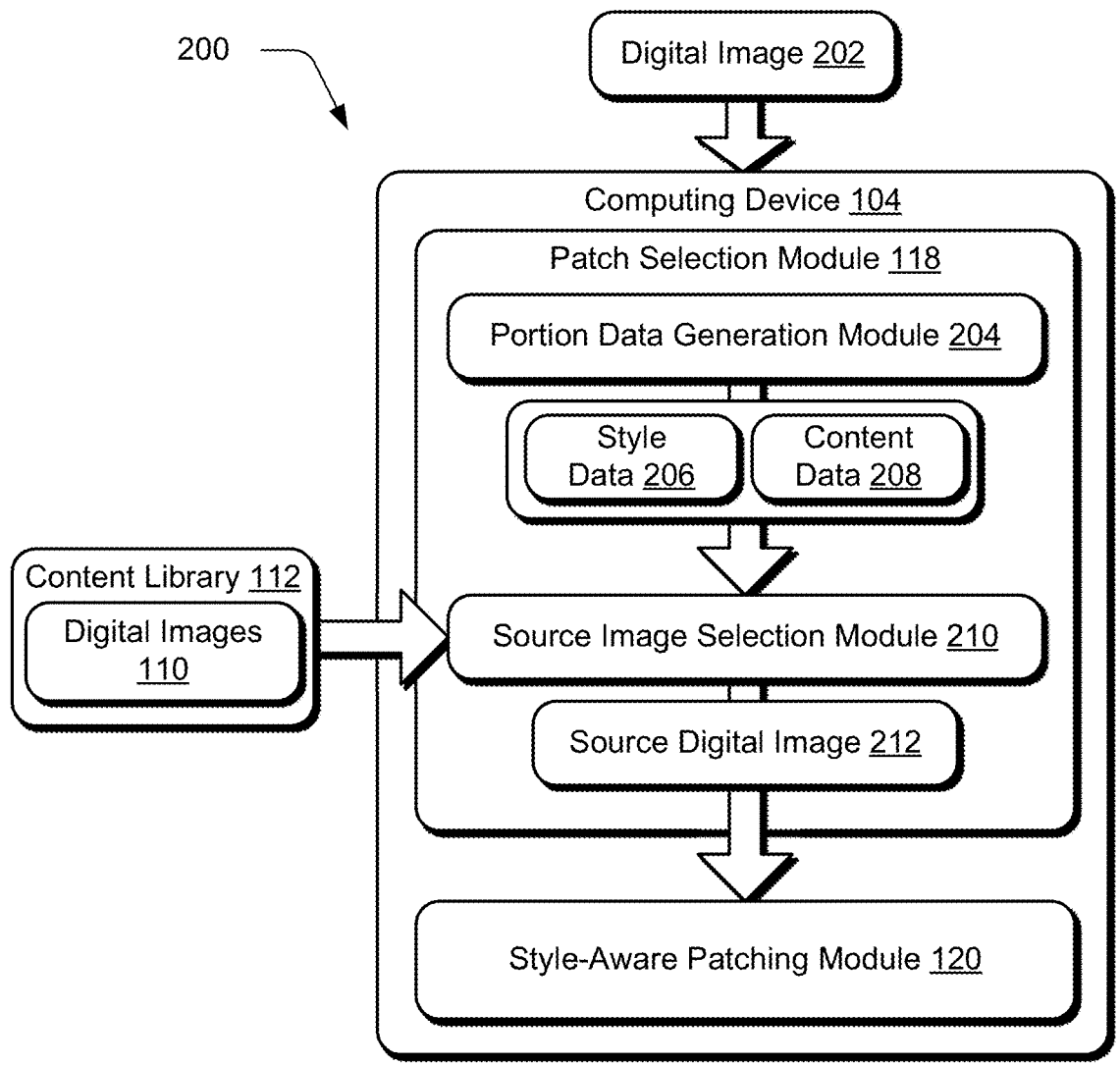
FIG. 2 depicts a system in an example implementation showing operation of a patch selection module of FIG. 1 in greater detail.

FIG. 2 depicts a system 200 in an example implementation showing operation of the patch selection module 118 of FIG. 1 in greater detail. To begin this example, the patch selection module 118 receives a digital image 202, such as from a camera of the computing device 104, a camera of another computing device (not pictured), and/or from the service provider system 102 as described above. In one example, the digital image includes a portion to be filled, such as a portion removed by a user input, a portion automatically removed by the computing device 104, a defect of the digital image that occurred during image capture or subsequent processing, and so forth.

A portion data generation module 204 generates style data 206 and content data 208 for the portion to be filled in the digital image 202. The style data 206 for the portion indicates a style of an area surrounding the portion to be filled. As discussed above, style data 206 represents an aesthetic of the digital image 202 including a set of principles underlying a particular manner or technique by which the digital image acquired a distinctive appearance. The style data 206 can indicate aesthetics such as watercolor painting, pencil drawing, spray painting, and so forth, or feelings associated with the digital image such as gloomy, scaly, cheerful, and so on.

For example, the portion data generation module 206 utilizes a style classifier trained on numerous digital images to determine one or more aesthetics and/or feelings to include in the style data 206. The style classifier uses machine learning techniques, such as a convolutional neural network, to generate a low-dimensional feature embedding for visual style. This embedding can be considered a digital fingerprint derived from the digital image that characterizes its aesthetic style, irrespective of its content. A convolutional neural network mimics connectivity patterns between neurons in the organization of the animal visual cortex. In animals, individual cortical neurons respond to stimuli in a restricted region of space known as the receptive field. The receptive fields of different neurons partially overlap such that they cover the entire visual field. The response of an individual neuron to stimuli within its receptive field can be approximated mathematically by the convolutional neural network using a convolution operation.

To learn the low-dimensional feature embedding, the convolutional neural network is presented with triplets of images comprising an "anchor" image of a particular style, a "positive" image of similar style to the "anchor," and a "negative" image of differing style to the "anchor" image. The convolutional neural network is architected in three branches of homogeneous structure which accept the anchor, positive, and negative images, respectively. The three branches share weights (e.g., are Siamese) and are unified by a single fully connected layer of low dimension (such as 128-D), appended to the convolutional neural network, from which the learned embedding is available. The set of digital images used to learn the embedding may be part of a library of digital images such as the Behance™ Media Dataset (BAM). Low-dimensional feature embedding creates a unique description of visual style of a digital image. Using a 128-D layer as described above feeds a digital image into a trained convolutional neural network, and the trained convolutional neural network outputs 128 numbers that characterize an aesthetic style of the digital image. While a 128-D layer is described herein, other layers may be used, such as 64-D, 256-D, and so forth.

The triplet network is trained via standard triplet loss by presenting image triplets in which the anchor and positive branches contain images of the same style (e.g., both objects are a watercolor style), but differ in content (e.g., a bike and a dog). The negative branch includes an image of a different style, but includes content similar to the anchor branch. Once trained, an image may be passed through any of the branches of the network and the low-dimensional feature embedding characterizing image style obtained from a final, fully connected layer in the convolutional neural network. In this manner, the style of digital images may be compared by passing the digital images through the convolutional neural network and measuring a similarity of features output by the convolutional neural network. For example, a Euclidian distance between a pair of such features may be measured to assess the stylistic similarity of the digital image pair from which those features were derived, irrespective of the content of the digital images in the digital image pair. Additional details regarding a style classifier that uses a convolutional neural network to describe style of digital images can be found in U.S. patent application Ser. No. 15/616,776, which is incorporated by reference herein in its entirety.

The portion data generation module 204 also generates content data 208 for the portion indicating content of the digital image 202 of the area surrounding the portion to be filled. The content data 208 represents objects or structure within the digital image irrespective of style, such as faces, buildings, a landscape, vehicles, and so forth. The portion data generation module 204 may use any suitable technique for generating the content data 208, such as CAD-like object models, appearance-based methods, feature-based methods, genetic algorithms, and so forth.

Next, a source image selection module 210 selects a source digital image 212 from multiple digital images to generate a patch for the portion to be filled. For example, the source image selection module 210 selects the source digital image 212 from the digital images 110 in the content library 112. The source image selection module 210 selects the source digital image 212 based on a similarity of a style of the source digital image at a location of the patch to the style data along with a similarity of content of the source digital image at the location of the patch to the content data.

First, the source image selection module 210 performs in image search that incorporates both style and content of the digital image 202 to narrow the number of digital images 110 in the content library 112 to a subset of digital images that are related to the digital image 202. From the subset of digital images, the source image selection module 210 samples candidate patches at a uniform size to produce a collection of candidate patches. In this way, the visual search for candidate patches performed by the source image selection module 210 is constrained based on both style and content of the digital image 202 as a search term.

Figure 3:
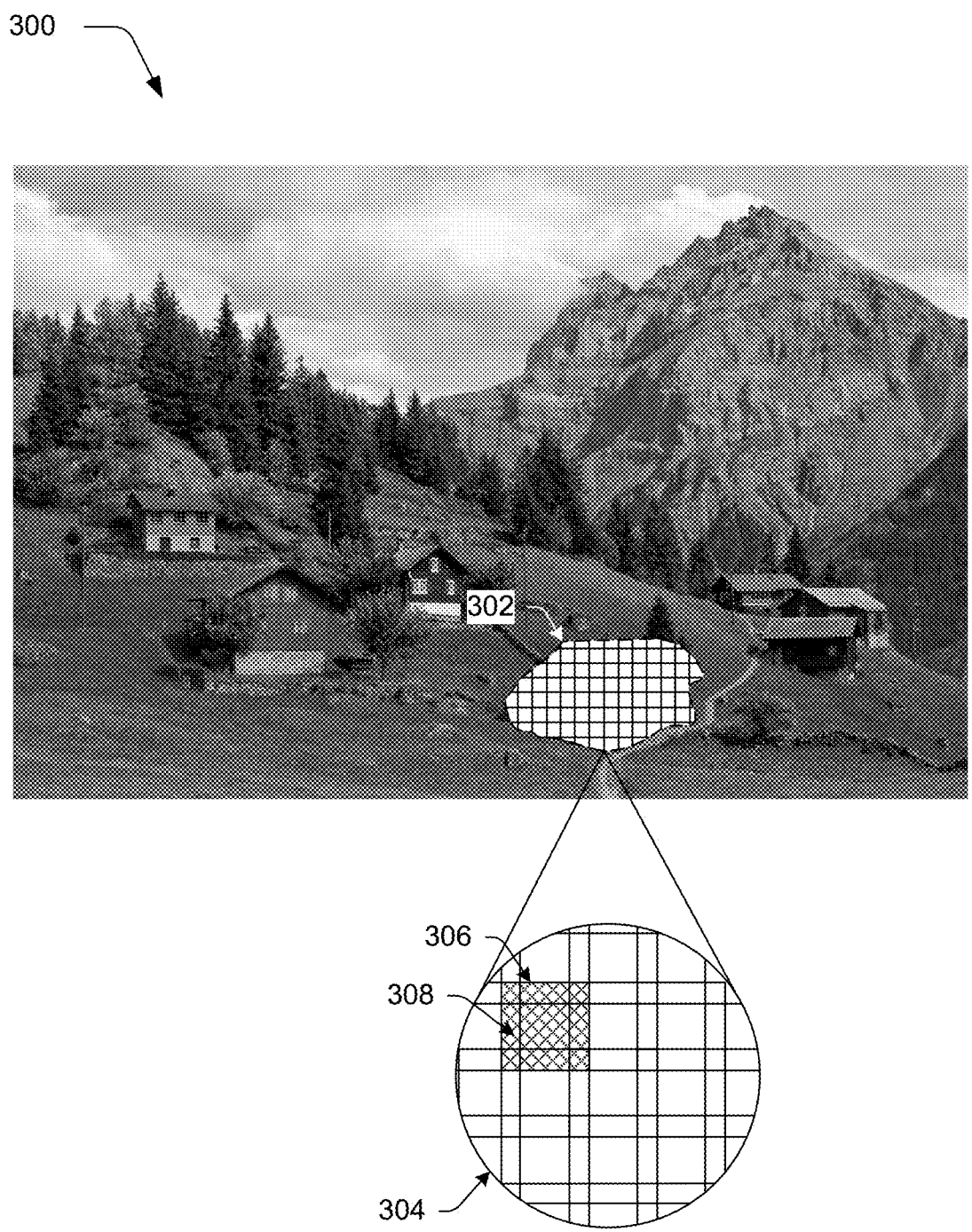
FIG. 3 depicts an example implementation showing determination of a number of cells for generating style-aware patches for a particular portion to be filled in a digital image.

Next, the source image selection module 210 forms a regular, overlapping grid of the portion to be filled, with each cell of the grid approximately the size of the candidate patch that will fill the cell in the portion. For example, consider FIG. 3 depicting an example of a number of cells for generating style-aware patches for a particular portion to be filled in a digital image. FIG. 3 illustrates a digital image generally at 300, including a portion 302 to be filled that has been removed from the digital image. The source image selection module 210, for instance, has created a grid within the portion 302, where the cells of the grid are approximately the size of a candidate patch that will be used to fill the portion.

A pop-out 304 of the portion 302 is shown displaying a zoomed-in view of the portion. The pop-out 304 displays the regular, overlapping grid formed by the source image selection module 210, where each of the cells of the grid is approximately the size of a patch that will be used to fill the portion of the digital image 300. A particular cell 306 of the grid shows an example of how the cells of the grid may overlap one another. The cell 306 includes subsections 308 that overlap the neighboring cells of the grid. In one example, each cell of the grid overlaps the neighboring cells by one half of a side length, although other amounts of overlap are also considered. The cells of the grid overlap in order to allow for blending of the patches when the patches are placed at the cells of the grid in the portion 302.

Returning to FIG. 2, after forming the grid, the source image selection module 210 selects a patch from the candidate patches of the subset of digital images for a cell of the grid. To select optimal patches for the cells of the grid, the source image selection module 210 applies a Markov Random Field (MRF) optimization to the candidate patches. The MRF optimization minimizes an energy function that balances the candidate patches to reduce deviation of both content and style of the patches to fill the portion of the digital image. One example MRF optimization function is follows:

$$E(x) = \sum_{i \in V} \psi_i(x_i) + \sum_{i \in V, j \in N_i} \psi_{ij}(x_i, x_j) + \sum_{i \in V} \sum_{c \in S} \psi_c(x_i)$$

Where V corresponds to a set of multiple grid cells formed in the portion of the digital image, and $N_i$ is a set of neighboring cells to a given cell i. The unary function $\psi_i(x_i)$ measures deviation of the content of a patch $x_i$ from proximate content in the digital image. To do so, the unary function $\psi_i(x_i)$ combines similarities for edge structure between the patch $x_i$ and the proximate content of the digital image, along with content similarity between the patch $x_i$ and the proximate content of the digital image. The pairwise term $\psi_{ij}(x_i, x_j)$ penalizes a high sum of square difference (SSD) in the overlap area 308 depicted in FIG. 3 between neighboring patches i, j. For example, the pairwise term can penalize a high difference in RGB color values in the overlap area between neighboring patches.

The tertiary term $\psi_c(x_i)$ encourages style coherence with proximate regions of the digital image. As discussed above and below, the visual aesthetic of a style can be considered a combination of several factors, e.g., media type, color distribution, feeling, and visual composition (the placement or arrangement of visual elements or ingredients in an image, as distinct from the subject). Such properties can be difficult to express over a small portion of a digital image (e.g., 11×11 pixels) that is to be used to patch a portion of another digital image. Therefore, the source image selection module 210 performs a superpixel segmentation of the digital image 202 with candidate patches in-filled into the portion to determine whether the candidate patches are sufficiently uniform to be incorporated into the portion of the digital image.

Figure 4:
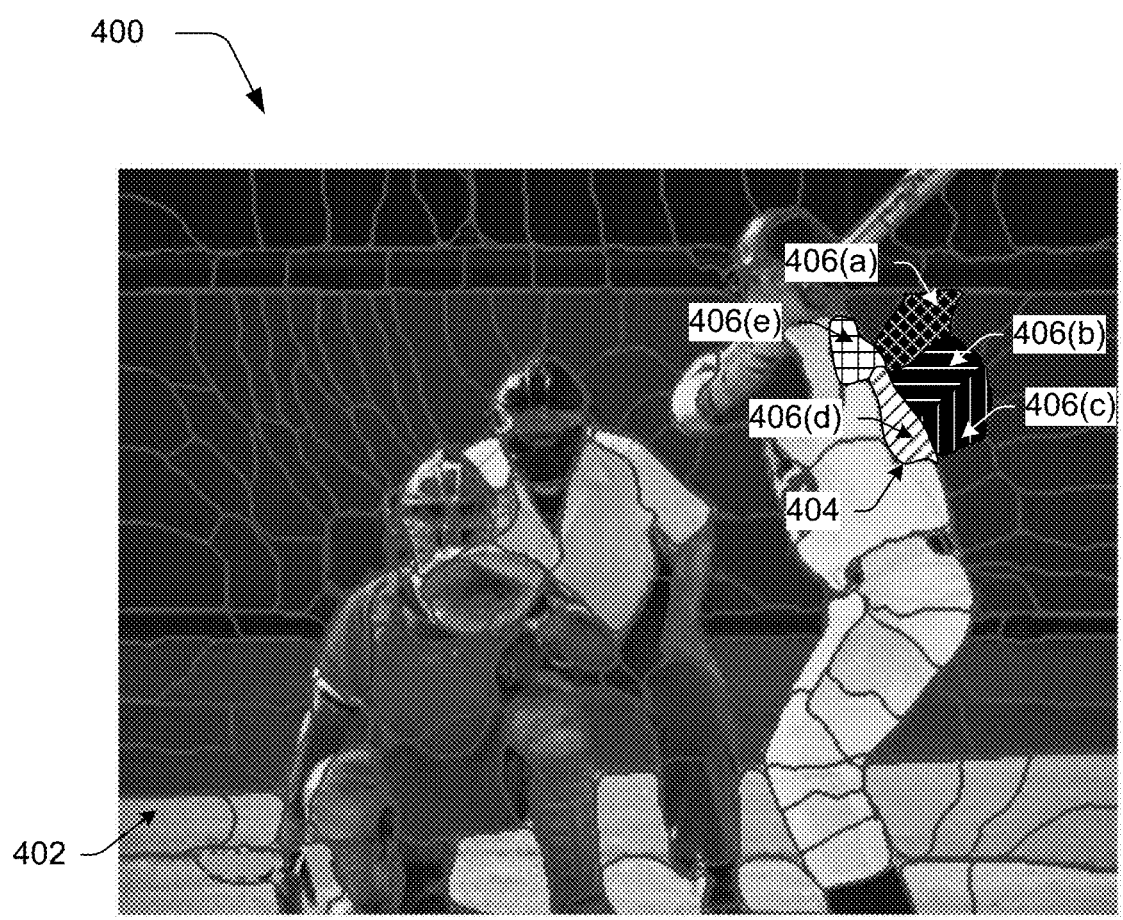
FIG. 4 depicts an example implementation showing a superpixel segmentation that may be used to generate style-aware patches for a portion to be filled in a digital image.

For example, consider FIG. 4, which depicts a digital image 400 including a superpixel segmentation that may be used to generate style-aware patches for a portion to be filled in a digital image. One technique for performing superpixel segmentation is a simple linear iterative clustering (SLIC) algorithm, although other techniques may be used, such as NC05, GS04, SL08, GCa10, GCb10, and so forth. Using the SLIC algorithm, a digital image can be segmented into superpixels of varying sizes, e.g., approximately 64 pixels, 256 pixels, 1024 pixels, and so forth. In the digital image 400, one example size of superpixels is shown in the outlined regions 402 of the digital image.

The digital image 400 includes a portion 404 to be filled of the digital image. In this example, the portion 404 has been filled with candidate patches from source digital images, as described above and below. When the source image selection module 210 performs a superpixel segmentation on the digital image 400, the source image selection module also performs the superpixel segmentation on the portion 404 including the candidate patches, generating in the superpixels 406(a)-(e). The superpixels 406(a)-(e) can be represented as a subset c ∈ S of all superpixels S in the digital image in the tertiary term in the above equation. The source image selection module 210 then generates a 128-D style descriptor for each of the S superpixels using the style classifier described above. Generally, the superpixels 406(a)-(e) are larger than individual patches selected to fill the portion 404, making the style properties described above (media type, color distribution, feeling, visual composition, etc.) easier to express in the superpixels rather than in individual patches.

Accordingly, the tertiary term in the above equation penalizes high covariance of style between among the style descriptors in the subset of patches c ∈ S proximate to a particular patch x. Minimization of the overall MRF energy function E(x) above thus encourages spatially coherent patch selection with respect to edge information (e.g., from the pairwise term) and with respect to local style coherence (e.g., from the tertiary term), while also ensuring similar local content distribution (e.g., from the unary term).

Alternatively, the energy function can be modified to take the form of a weighted average unary potential of patches overlapping superpixels, shown below:

$$E(x) = \sum_{i \in V} \left( \psi_i(x_i) + \frac{\theta_c}{|c|} \sum_{j \in c} \psi_j(x_i) \right) + \sum_{i \in V, j \in N_i} \psi_{ij}(x_i, x_j)$$

This alternative energy function may be convenient as this spatially "higher order" term does not take multiple numbers of variables in the clique. Thus, the alternative energy function can be further merged into the unary term, simplifying the energy function to a form solvable using standard alpha-beta expansion.

Returning to a discussion of FIG. 2, the source image selection module 210 selects the source digital image 212 based on a minimization of one of the energy functions described above that incorporates a style coherence term for patch selection. The patch selection module 118 then outputs the source digital image 212 to the style-aware patching module 120 to incorporate a patch from the source digital image into the portion to be filled of the digital image 202.

Figure 5:
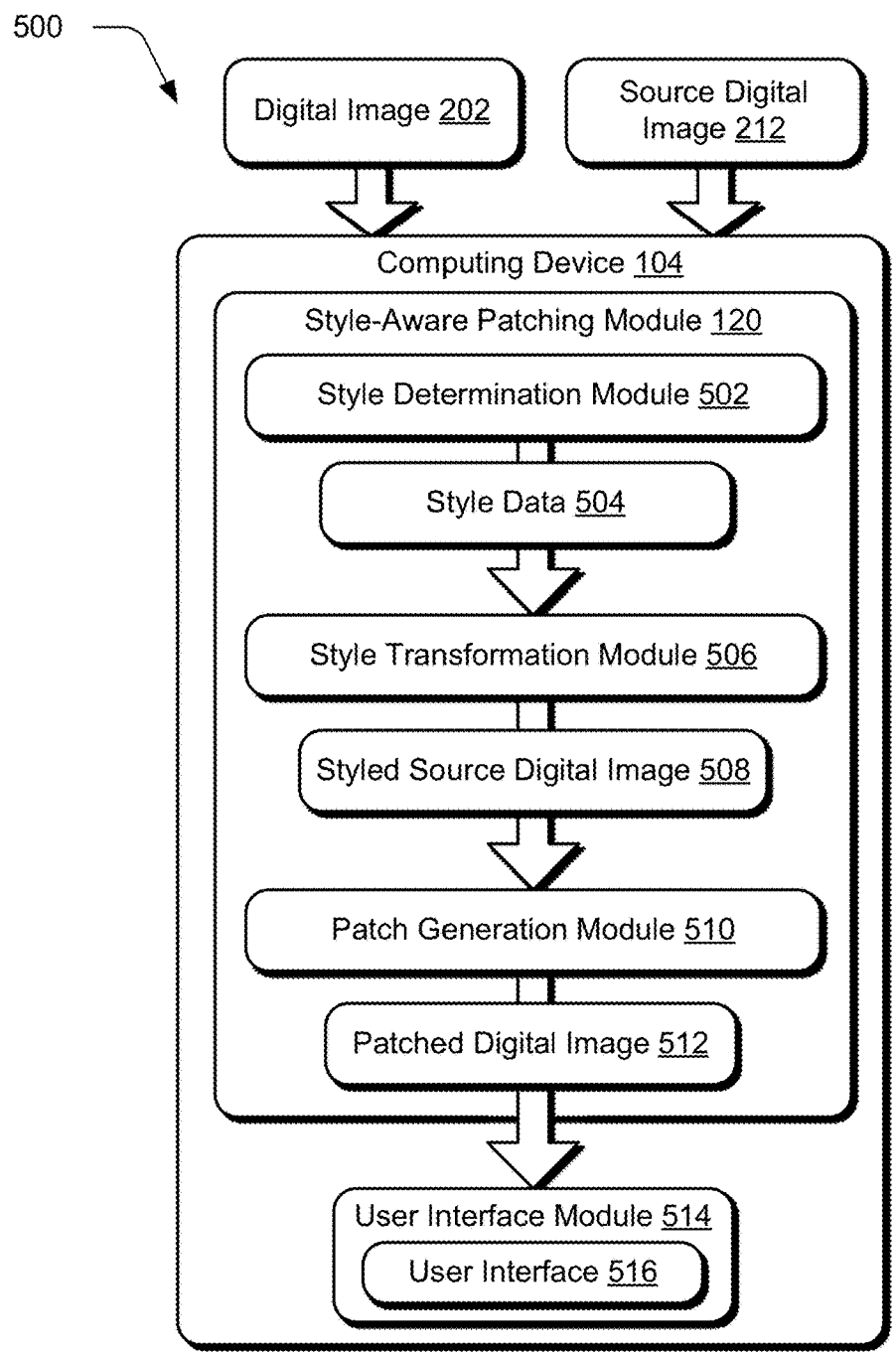
FIG. 5 depicts a system in an example implementation showing operation of a style-aware patching module of FIG. 1 in greater detail.

FIG. 5 depicts a system 500 in an example implementation showing operation of the style-aware patching module 120 of FIG. 1 in greater detail. To begin this example, the style-aware patching module 120 receives the digital image 202, along with the source digital image 212 selected by the patch selection module 118. In one example, the digital image 202 includes a portion to be filled, such as a portion removed by a user input, a portion automatically removed by the computing device 104, a defect of the digital image that occurred during image capture or subsequent processing, and so forth. The source digital image 212, in this example, has been selected based on a similarity of content and a similarity of style between an area surrounding the portion to be filled of the digital image and the patch from the source digital image, as described above.

A style determination module 502 generates style data 504 for the area surrounding the portion to be filled of the digital image 202, independent of the content of the area surrounding the portion to be filled. The style data 504 represents an aesthetic of the digital image 202 including a set of principles underlying a particular manner or technique by which the digital image acquired a distinctive appearance. The style data 504 can indicate aesthetics such as watercolor painting, pencil drawing, spray painting, and so forth, along with feelings associated with the digital image such as gloomy, scaly, cheerful, and so on. Similar to the discussion above, the style determination module 502 may use a style classifier trained on numerous digital images to determine one or more aesthetics and/or feelings to include in the style data 504. Alternatively, the style-aware patching module may utilize the style data 206 generated by the portion data generation module 204, in place of the style data 504 generated by the style determination module 502.

A style transformation module 506 transforms the style of the source digital image 212 based on the style data 504 for the area surrounding the portion to be filled of the digital image 202. In other words, the patch is stylized by applying the style transformation to all of the source digital image 212, or to a larger area in the source digital image than the area that will be used for the patch, prior to cropping the patch for incorporation into the digital image 202. To transform the style of the source digital image 212, the style transformation module 506 utilizes the feature embedding from the style classifier described above. For a given patch in the solved MRF grid of the portion of the digital image 202, the superpixels proximate to the patch are known from the source image selection module 210. Additionally, the points in the 128-D style embedding that describe the style of the superpixels independent of the content of the superpixels determined by the source image selection module 210 can be used by the style transformation module 506.

Figure 6:
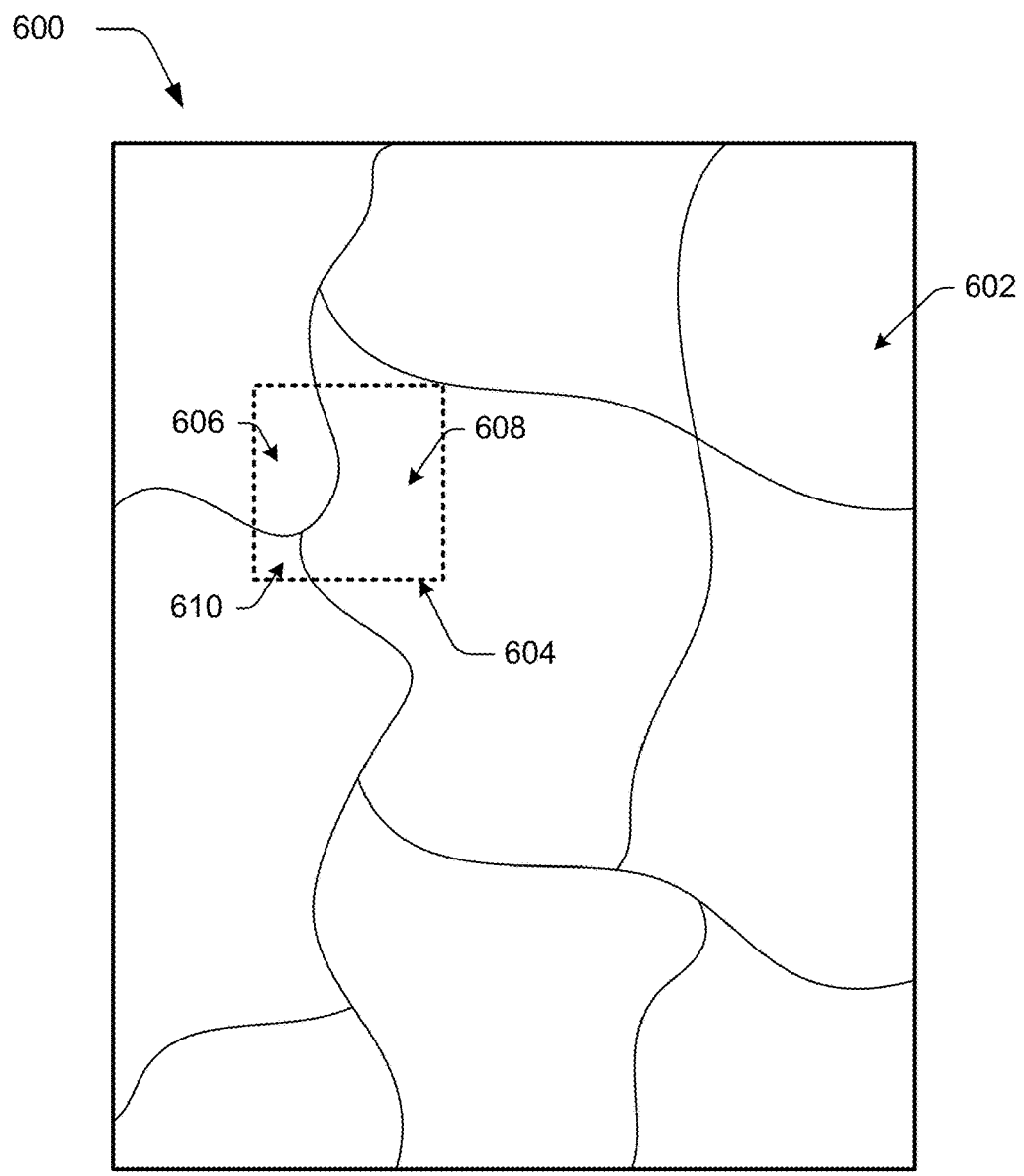
FIG. 6 depicts an example implementation showing multiple superpixels used to determine a style for a style-aware patch to fill a portion of a digital image.

For example, consider FIG. 6, depicting multiple superpixels used to determine a style for a style-aware patch to fill a portion of a digital image. In this example, a region 600 of a digital image is shown that includes a number of superpixels, such as superpixel 602. The digital image that includes the region 600 has been segmented into the superpixels as described above, for example by using SLIC segmentation by the source image selection module 210. Additionally, the digital image that includes the region 600 includes a patch 604 that has been selected from a source digital image, such as by the source image selection module 210.

As discussed above, the points in the 128-D style embedding have been determined for the superpixels in the region 600, describing style properties such as media type, color distribution, feeling, visual composition, and so forth. If a patch is located within a single superpixel, the style transformation module 506 can use the style of the superpixel to transform the style of the source digital image from which the patch originated. However, if the patch is located over multiple superpixels, as the patch 604 is shown, the style transformation module 506 computes a weighted average of the points in the 128-D style embedding for each of the superpixels 606, 608, 610 that overlap the patch. The weighted average of the points in the 128-D style embedding for the multiple superpixels 606, 608, 610 is based on an area of overlap with the patch 604. In this example, the point in the 128-D style embedding for the superpixel 610 would have the lowest weight, the point in the 128-D style embedding for the superpixel 606 would have a higher weight, and the point in the 128-D style embedding for the superpixel 608 would have the highest weight, based on the respective areas of overlap with the patch 604.

Returning to the discussion of FIG. 5, the style transformation module 506 transforms the style of the source digital image 212 based on the determined style of one or more superpixels that overlap the patch at the intended location for the patch in the portion of the digital image 202. That is, before the patch is incorporated into the portion of the digital image 202, the style of the source digital image 212 is transformed based on the style of the intended location for the patch. To do so, the style transformation module 506 can synthesize an activation image that minimizes a distance between the activation of the 128-D bottleneck (i.e., the final layer) of the triplet network described above and the desired 128-D style point for the patch. The style transformation module 506 uses the synthesized activation image to generate a stylized source digital image 508 that adopts the style of the location where the patch will be incorporated into the digital image 202.

Next, a patch generation module 510 receives the styled source digital image 508 and uses the styled source digital image to generate a patch for incorporation into the portion to be filled of the digital image 202. The patch generation module 510 crops the patch from the styled source digital image 508 to approximately match the size of the cell of the MRF grid that will receive the patch. The patch generation module 510 then copies the cropped patch into the location of the MRF grid within the portion to be filled of the digital image 202.

When incorporating the patch into the portion of the digital image 202, the patch generation module 510 can apply additional techniques to further reduce visual distractions at the location of the patch. For instance, the patch generation module 510 may blending algorithms to integrate the patch into the portion of the digital image 202, such as a gradient domain compositing operator (e.g., Poisson blending), a convolutional pyramid algorithm, and so forth. Alternatively or additionally, the patch generation module 510 can apply color transfer to the patch as well, to further match where the patch will be incorporated into the digital image 202. Once the patch is copied into the portion to be filled and finalized with any additional alterations, the patch generation module 510 generates a patched digital image 512, which includes the patch from the source digital image 212 in the transformed style incorporated into the digital image 202.

The patch generation module 510 outputs the patched digital image 512 that includes the patch from the source digital image 212 in the transformed style incorporated into the digital image 202. The patch generation module 510 can output the patched digital image 512 to a user interface module 514, which outputs the patched digital image in a user interface 516 of the computing device 104. The user interface 516 may enable a user of the computing device 104 to edit or modify the patched digital image 512, and/or distribute the patched digital image to the service provider system 102, to name some examples.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
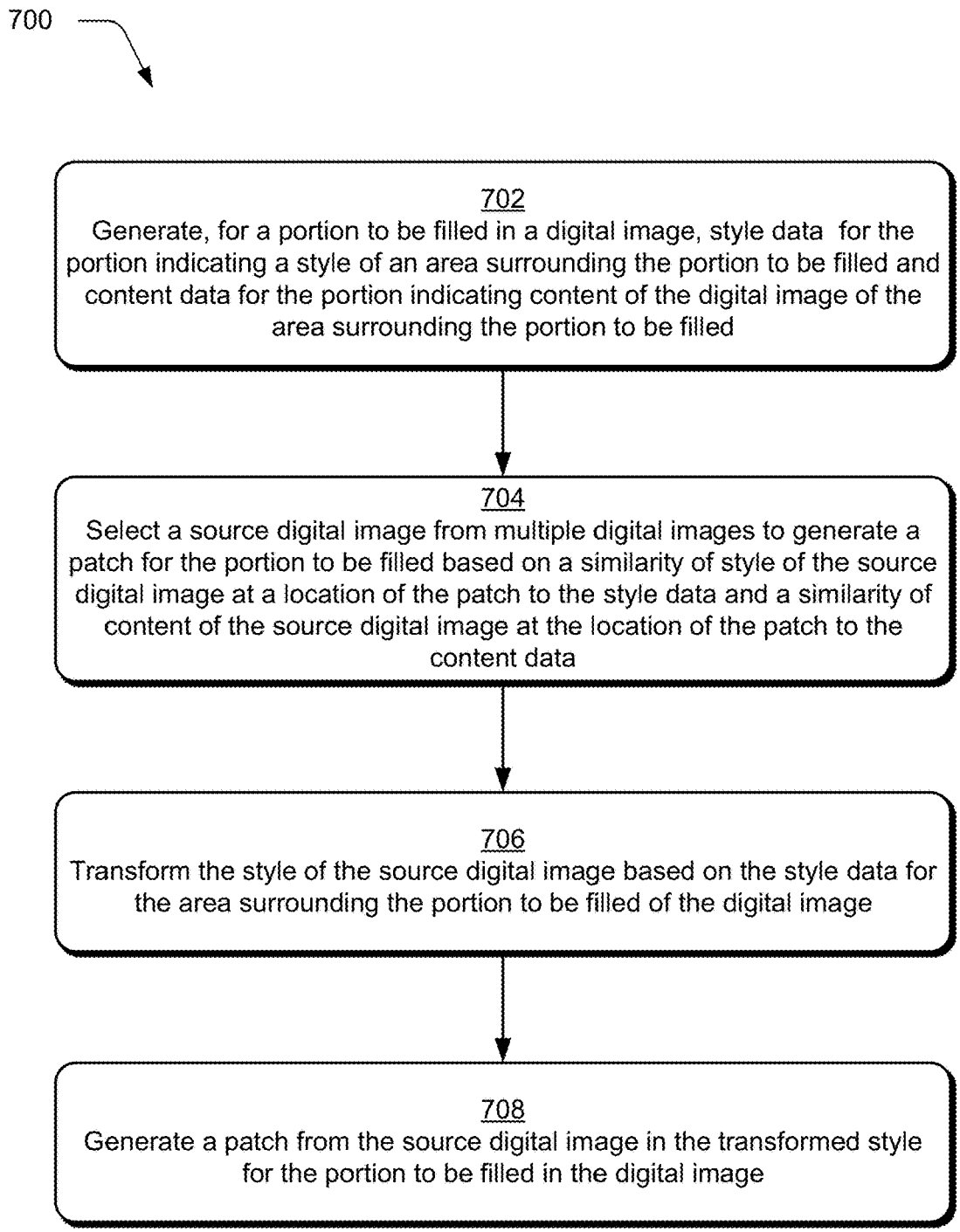
FIG. 7 is a flow diagram depicting a procedure in an example implementation in which style-aware patching is performed based on both content of a digital image and style of a digital image in a digital image creation system.

FIG. 7 depicts a procedure 700 in an example implementation in which a style-aware patch is selected and incorporated into a portion to be filled of a digital image. First, style data and content data are generated for a portion to be filled in a digital image (block 702). The style data indicates a style of an area surrounding the portion to be filled. As discussed above, the style data represents an aesthetic of the digital image including a set of principles underlying a particular manner or technique by which the digital image acquired a distinctive appearance. The style data can indicate aesthetics such as watercolor painting, pencil drawing, spray painting, and so forth, or feelings associated with the digital image such as gloomy, scaly, cheerful, and so on. In one example, the portion data generation module 206 utilizes a style classifier trained on numerous digital images to determine one or more aesthetics and/or feelings to include in the style data 206.

The content data represents objects or structure within the digital image irrespective of style, such as faces, buildings, a landscape, vehicles, and so forth. The portion data generation module 204 may use any suitable technique for generating the content data, such as CAD-like object models, appearance-based methods, feature-based methods, genetic algorithms, and so forth.

A source digital image is then selected from multiple digital images to generate a patch for the portion to be filled (block 704). The source digital image is selected based on a similarity of style of the source digital image at a location of the patch to the style data, and a similarity of content of the source digital image at the location of the patch to the content data. The source image selection module 210 performs an image search that incorporates both style and content of the digital image 202 to narrow the number of digital images 110 in the content library 112 to a subset of digital images that are related to the digital image 202. From the subset of digital images, the source image selection module 210 samples candidate patches at a uniform size to produce a collection of candidate patches to constrain the subset of source digital images based on both style and content of the digital image 202 as a search term.

Next, the source image selection module 210 forms a regular, overlapping grid of the portion to be filled, with each cell of the grid approximately the size of the candidate patch that will fill the cell in the portion. Then, the source image selection module 210 selects a patch from the candidate patches of the subset of digital images for a cell of the grid such as by applying a Markov Random Field (MRF) optimization to select from the candidate patches. The source image selection module 210 performs a superpixel segmentation of the digital image 202 with candidate patches in-filled into the portion to determine whether the candidate patches are sufficiently uniform to be incorporated into the portion of the digital image. Finally, the source image selection module 210 applies a style descriptor to the superpixels with candidate patches in-filled into the portion, and minimizes the MRF optimization using the style descriptors of the superpixels to determine which source digital image to use for the patch.

The style of the source digital image is transformed based on the style data for the area surrounding the portion to be filled in the digital image (block 706). For example, the style transformation module 506 applies a style transformation to all of the source digital image, or to a larger area in the source digital image than the area that will be used for the patch, prior to cropping the patch for incorporation into the digital image. If a patch is located within a single superpixel, the style transformation module 506 can use the style descriptor of the superpixel to transform the style of the source digital image. However, if the patch is located over multiple superpixels, the style transformation module 506 computes a weighted average of the points in the 128-D style embedding based on how much each of the superpixels overlap the patch. Then, the style transformation module 506 synthesizes an activation image that minimizes a distance between the activation of the 128-D bottleneck (i.e., the final layer) of the triplet network described above and the desired 128-D style point for the patch. The style transformation module 506 uses the synthesized activation image to generate a stylized source digital image that adopts the style of the location where the patch will be incorporated into the digital image.

Next, a patch is generated form the source digital image in the transformed style for the portion to be filled in the digital image (block 708). The patch generation module 510 crops the patch from the styled source digital image to approximately match the size of the cell of the MRF grid that will receive the patch. The patch generation module 510 then copies the cropped patch into the location of the MRF grid within the portion to be filled of the digital image. When incorporating the patch into the portion of the digital image, the patch generation module 510 can apply additional techniques to further reduce visual distractions at the location of the patch, as discussed above. The digital image with the incorporated, style-aware patch can then be output to a user interface, the service provider system 102, and so forth.

Using the techniques described herein, patches can be generated and incorporated into digital images based on both content and style, greatly reducing visual distractions at the location of the patch. By taking style into account when searching for source images to be used for a patch, search results are tailored to exclude digital images that would result in a visually inconsistent patch when incorporated into the digital image. Even with the tailored search results, a margin of error in style differences is accounted for by stylizing the source digital image when generating the patch. By stylizing the patch of the source digital image prior to compositing the patch into the portion to be filled, the patch can be harmonized with neighboring regions to further reduce visual inconsistencies in the final output digital image.

Example System and Device

Figure 8:
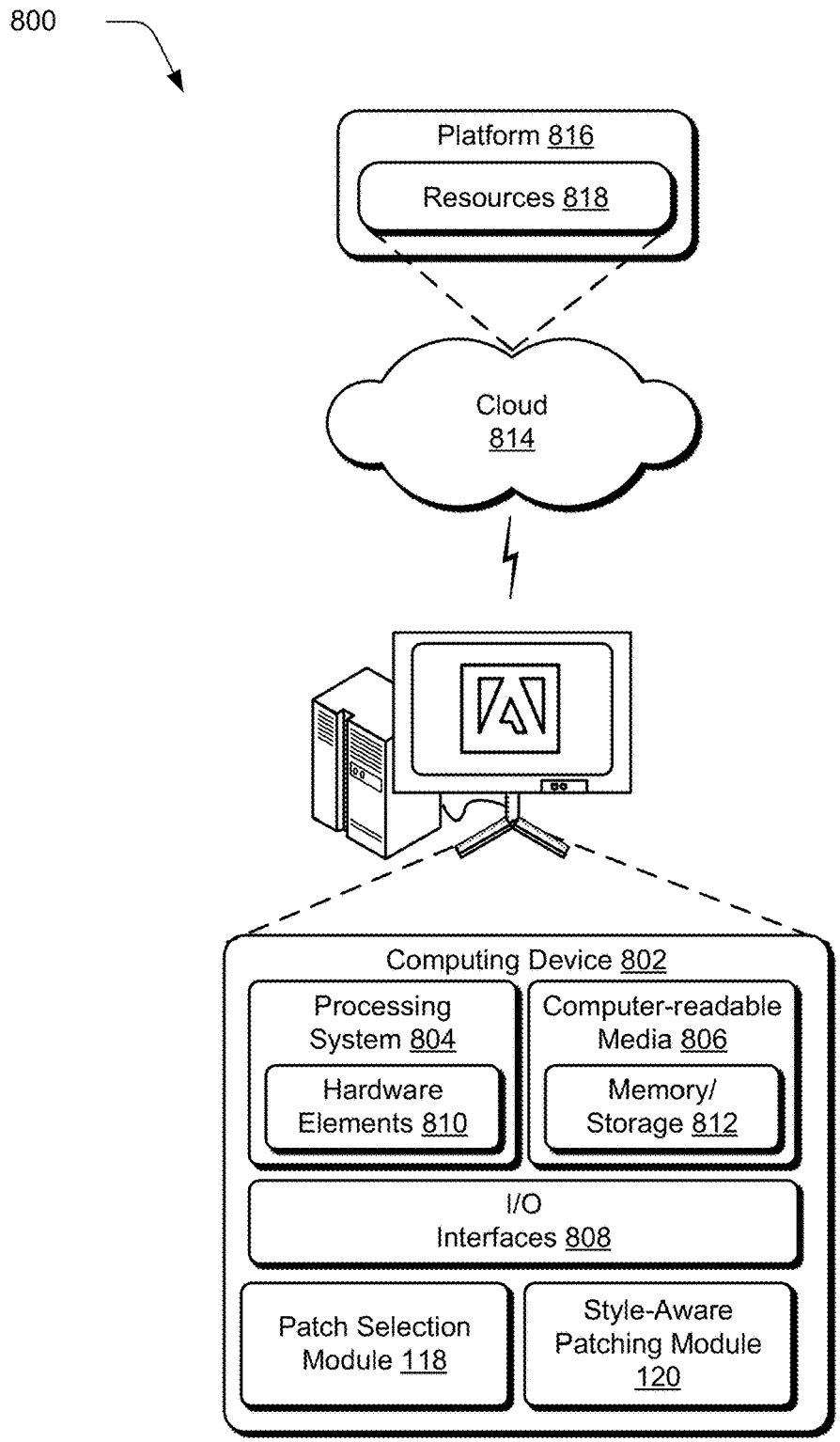
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the patch selection module 118 and the style-aware patching module 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for style-aware patching in a digital image, a method implemented by at least one computing device, the method comprising:
    performing an image search to select a subset of digital images that are related to the digital image based on both a similarity of content and a similarity of style;
    selecting a patch from a source digital image of the subset of digital images that are related to the digital image based on the similarity of content and the similarity of style between an area surrounding a portion to be filled of the digital image and the patch of the source digital image;
    generating style data for the area surrounding the portion to be filled of the digital image and independent of the content of the area surrounding the portion to be filled of the digital image;
    transforming the style of the source digital image based on the style data for the area surrounding the portion to be filled of the digital image;
    generating the patch from the source digital image in the transformed style for incorporation into the portion to be filled of the digital image;
    cropping the patch from the source digital image in the transformed style to match a size of a cell of a grid in the portion to be filled of the digital image; and
    copying the cropped patch to the cell in a location of the grid within the portion to be filled of the digital image.

2. The method of claim 1, wherein the style data is generated using a style classifier trained on numerous digital images to determine one or more aesthetics or feelings to include in the style data.

3. The method of claim 2, wherein the style classifier is a convolutional neural network trained to perform low-dimensional feature embedding for visual style.

4. The method of claim 1, wherein the generating the style data further comprises applying a superpixel segmentation to the digital image and determining style descriptors for superpixels from the superpixel segmentation to be used for the style data.

5. The method of claim 4, wherein the transforming the style of the source digital image is based on a style descriptor for a particular superpixel that contains the patch in the portion to be filled of the digital image.

6. The method as described in claim 4, wherein the transforming the style of the source digital image is based on a weighted average of multiple style descriptors for particular superpixels that overlap the patch in the portion to be filled of the digital image.

7. The method as described in claim 6, wherein the weighted average of the multiple style descriptors for the particular superpixels is proportional to the area that each of the particular superpixels overlap the patch.

8. The method as described in claim 1, further comprising applying a gradient domain compositing operator, a convolutional pyramid algorithm, or color transfer to the patch for incorporation into the portion to be filled of the digital image.

9. In a digital medium environment for style-aware patching in a digital image in a digital image creation system, a system comprising:

a patch selection module implemented at least partially in hardware of at least one computing device to perform an image search to select a subset of digital images that are related to the digital image based on both a similarity of content and a similarity of style, and to select a patch from a source digital image of the subset of digital images that are related to the digital image based on the similarity of content and the similarity of style between an area surrounding a portion to be filled of the digital image and the patch of the source digital image;

a style determination module implemented at least partially in hardware of the at least one computing device to generate style data for the area surrounding the portion to be filled of the digital image and independent of the content of the area surrounding the portion to be filled of the digital image;

a style transformation module implemented at least partially in hardware of the at least one computing device to transform the style of the source digital image based on the style data for the area surrounding the portion to be filled of the digital image; and a patch generation module implemented at least partially in hardware of the at least one computing device to:
generate the patch from the source digital image in the transformed style for incorporation into the portion to be filled of the digital image;
crop the patch from the source digital image in the transformed style to match a size of a cell of a grid in the portion to be filled of the digital image; and
copy the cropped patch to the cell in a location of the grid within the portion to be filled of the digital image.

10. The system as described in claim 9, wherein the style determination module is further configured to apply a superpixel segmentation to the digital image and determine style descriptors for superpixels from the superpixel segmentation to be used for the style data.

11. The system as described in claim 10, wherein the style transformation module is further configured to transform the style of the source digital image based on a style descriptor for a particular superpixel that contains the patch in the portion to be filled of the digital image.

12. The system as described in claim 10, wherein the style transformation module is further configured to transform the style of the source digital image based on a weighted average of multiple style descriptors for particular superpixels that overlap the patch in the portion to be filled of the digital image.

13. The system as described in claim 12, wherein the weighted average of the multiple style descriptors for the particular superpixels is proportional to the area that each of the particular superpixels overlap the patch.

14. The system as described in claim 9, wherein the patch generation module is further configured to apply a gradient domain compositing operator, a convolutional pyramid algorithm, or color transfer to the patch for incorporation into the portion to be filled of the digital image.

15. A computer-readable storage device having instructions stored thereon that, responsive to execution by one or more processors, perform operations comprising:
performing an image search to select a subset of digital images that are related to a digital image based on both a similarity of content and a similarity of style;
selecting a patch from a source digital image of the subset of digital images that are related to the digital image based on the similarity of content and the similarity of style between an area surrounding a portion to be filled of the digital image and the patch of the source digital image;
generating style data for the area surrounding the portion to be filled of the digital image and independent of the content of the area surrounding the portion to be filled of the digital image;
transforming the style of the source digital image based on the style data for the area surrounding the portion to be filled of the digital image;
generating the patch from the source digital image in the transformed style for incorporation into the portion to be filled of the digital image;
cropping the patch from the source digital image in the transformed style to match a size of a cell of a grid in the portion to be filled of the digital image; and
copying the cropped patch to the cell in a location of the grid within the portion to be filled of the digital image.

16. The computer-readable storage device of claim 15, wherein the generating the style data further comprises applying a superpixel segmentation to the digital image and determining style descriptors for superpixels from the superpixel segmentation to be used for the style data.

17. The computer-readable storage device of claim 16, wherein the transforming the style of the source digital image is based on a style descriptor for a particular superpixel that contains the patch in the portion to be filled of the digital image.

18. The computer-readable storage device of claim 16, wherein the transforming the style of the source digital image is based on a weighted average of multiple style descriptors for particular superpixels that overlap the patch in the portion to be filled of the digital image.

19. The computer-readable storage device of claim 18, wherein the weighted average of the multiple style descriptors for the particular superpixels is proportional to the area that each of the particular superpixels overlap the patch.

20. The computer-readable storage device of claim 15, wherein the operations further comprise applying a gradient domain compositing operator, a convolutional pyramid algorithm, or color transfer to the patch for incorporation into the portion to be filled of the digital image.

* * * * *